United States Patent [19]

Rogen

[11] 3,999,790
[45] Dec. 28, 1976

[54] HEAT RELEASABLE LOCK

[75] Inventor: Neil E. Rogen, Upper Saddle River, N.J.

[73] Assignee: Nicoa Corporation, Ridgewood, N.J.

[22] Filed: Oct. 6, 1975

[21] Appl. No.: 619,935

[52] U.S. Cl. .................. 292/201; 292/DIG. 66; 292/288; 292/253; 292/282
[51] Int. Cl.² .................. E05C 19/08; E05C 19/18
[58] Field of Search ............ 49/1, 2; 292/253, 282, 292/288, DIG. 66, 201, 144

[56] References Cited

UNITED STATES PATENTS

| 27,524 | 3/1860 | Clark | 292/282 |
| 2,300,161 | 10/1942 | Mather | 292/253 X |
| 3,889,314 | 6/1975 | McCabe | 49/2 X |

Primary Examiner—Richard E. Moore
Attorney, Agent, or Firm—Jerry Cohen; Charles Hieken

[57] ABSTRACT

A locked enclosure may be eventually automatically unlocked by a simple pin element in a hasp-lock which drops out of the hasp-lock in case of temperatures associated with a fire.

8 Claims, 6 Drawing Figures

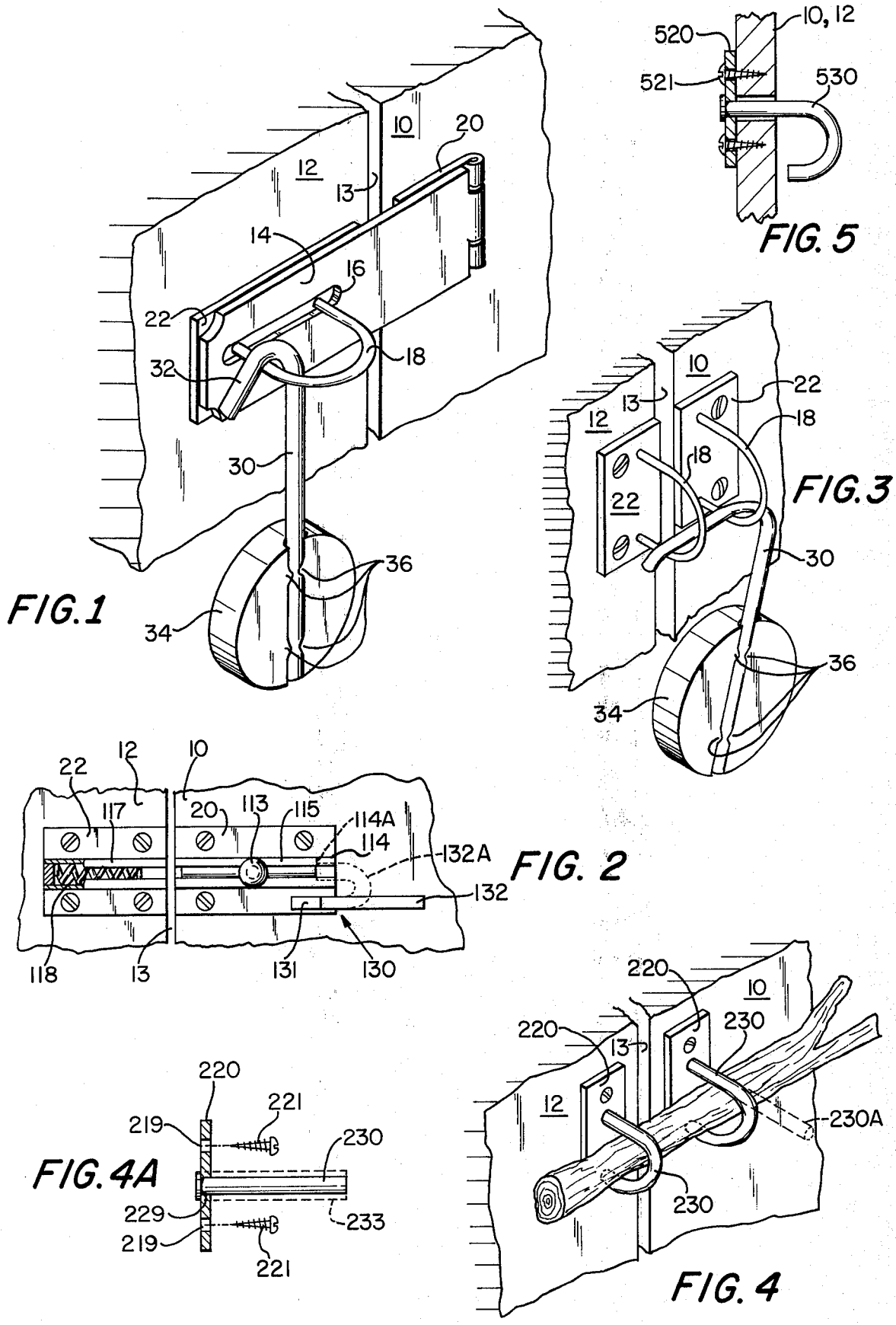

HEAT RELEASABLE LOCK

BACKGROUND OF THE INVENTION

The present invention relates to locks and more particularly to automatic release of locks in case of fire in situations where human intervention may be unavailable to release the lock.

For instance, one of the major fears of animal stall and stable owners and other keepers of livestock is that in case of fire, the animals will not be able to escape unless a watchman releases the enclosure for their holding area.

It is an important object of the present invention to provide a simple, inexpensive, yet reliable, lock which is thermally releasable.

SUMMARY OF THE INVENTION

In accordance with the present invention, a locking system comprises means defining locking elements for holding a door (including gates, tops, windows and the like within such definition) and further means defining a pin or the like to prevent automatic release of the locking means by simple pressure on the door and means for thermally removing the pin from the lock to allow such normal pressures to open the door, easily shifting aside the locking means. Preferably the locking means comprises a hasp-lock arrangement as illustrated below in connection with the preferred embodiment of the invention; but other locking means are contemplated within the scope of the invention.

The thermal release is based on utilization of martensitic transformation of certain material and resultant shape memory effects in such materials.

In simplest form, a rod of such material can be bent through the staple of a hasp-lock. When the rod is exposed to heat, such as a building fire, it will unbend its bent portion and clear the staple, allowing the clasp portion of the hasp-lock to be pushed aside easily when force is applied to the door.

Nickel, iron and cobalt when alloyed with titanium exhibit configuration memory capabilities when worked above such a transition temperature such that they can be further worked below such a transition temperature and upon raising their temperature to the transition temperature level, they will make a distinct spontaneous movement to the first worked configuration. A preferred alloy for purposes of the present invention is nickel-titanium in approximately equal atomic percentages known as Nitinol. However, other alloys may be employed, e.g., gold-cadmium, indium-thallium nickel aluminide, elemental cobalt or titanium or zirconium and in the further binary alloys, iron-nickel, copper aluminum and cobalt-nickel.

The mechanism of martensitic shear, also known as diffusionless transformation, and the reversibility of the same are not entirely understood in the art, but are commonly understood to include atomic movement between adjacent planes of atoms through less than a full interatomic distance (based on normal atomic lattice spacings). Such movement is possible because in working below the "transition temperature range" these particular materials, certain localized electron bonds are broken. Raising temperature above the transition temperature range causes the formation of strong, energetic and directional electron bonds that pull the displaced atoms back to their predeformed positions. The nature of the movement of atoms is essentially a slipping of atomic planes — comparable to what would happen to an aligned deck of playing cards if a shearing force were applied, i.e., each card sliding slightly out of alignment with its immediate neighboring card.

On a gross mechanical level, such materials exhibit a shape memory effect. That is, they can be plastically deformed while exposed to a temperature below the transition temperature range and subsequently, upon exposure to a temperature within the temperature transition temperature range, they will automatically revert to the original configuration. Such gross effects arise from the above discussed planar slipping due to shear forces and more particularly in an acicular martensitic phase produced by the plastic deformation. The acicularity is removed by heating into or above the transition temperature range and, again on a gross mechanical level, the material will be seen to reverse the deformation to an extent determined by the degree of temperature rise.

Numerous other objects, features and advantages of the invention will be apparent from the following detailed description of a preferred embodiment of the invention taken in connection with the accompanying drawing in which:

BRIEF DESCRIPTION OF THE DRAWING

FIGS. 1-5 are partial views of a door and building frame incorporating preferred embodiments of the invention, shown in isometric form, in each case and FIG. 4A is a cross section view of the FIG. 4 locking and limiting elements.

DETAILED DESCRIPTION OF PREFERRED EMBODIMENTS

Referring to FIG. 1, a portion of a door is indicated at 10 and is shown slightly ajar with respect to a wall 12 of a stall, stable, barn, pen or the like, containing a door frame 13. A spring (not shown) may be provided as in conventional practice to open door 10 when not otherwise restrained. A hasp-lock for the door comprises a clasp 14 with a groove 16 therein which can pass over a staple 18. The clasp is secured to the door by a plate 20, screwed into the door, and the staple is secured to the building by a plate 22 screwed into the building wall. In order to secure the door, the clasp 14 is pushed toward the staple and groove 16 passes over the staple leaving an exposed end thereof. Conventional stall practice is to simply put a twig or branch through the staple or, occasionally an unlocked padlock.

Instead, in accordance with the present invention, a rod 30 made of the above described Nitinol alloy or the like is passed through the staple and at that time or earlier the end 32 thereof is curved. The curved end 32 hooks on to the staple. A heavy weight 34 is spherical or disc or other form is secured to the lower end of the rod 30 by crimps as indicated at 36 or, alternatively, by other means such as welding, cotter pin, etc. The material for rod 30 is selected to have a temperature transformation range well above any normally encountered ambient temperatures, but well below actual fire temperatures so that heat transfer to the building wall 12 from a fire within the building or other enclosure defined thereby will pass to the plate 22 and then to the clasp 14 and finally to the rod end 32 by combination of conduction, convective and radiant mechanisms to cause reversal of the martensitic transformation and straightening of the rod 32 by shape memory effect.

When the rod heats and straightens, the weight 34 pulls the rod 30 down and normal pressures of animals against door 10 will open it with clasp 14 sliding easily over staple 18 to allow such opening.

It will be understood that other embodiments may be made within the scope of the invention, including, without limitation, means other than gravity for e.g., spring loading to drive the pin out of the staple after the pin straightens. The lock may be something other than a hasp-lock type, e.g., a dead bolt which is pushed back by a lever of martensitic material which undergoes the reversible transformation on one or more occasions when the bolt is thrown. Normal release of the bolt without the necessary temperature rise, will not allow reversal of the transformation. But high temperature will.

Referring now to FIG. 2, there is shown a further embodiment of the invention where a door 10 in opening 13 of a building frame 12 is normally restrained from opening by locking elements mounted on plates 20 and 22 on door and barn, 10 and 12, respectively, and comprising a dead bolt 114 which moves in a cylindrical holder 115 to cross over into a cylindrical holder 117 containing a compression spring 118. A person can grasp pin 113 extending from dead bolt 114 to slide the dead bolt over into holder 117, the back of dead bolt 114 being then as indicated at 114A. Then the person can bend the free end 132 of the martensitic transformation wire 130 held securely to plate 20 by a sleeve 131 (or welded to the plate). The bent end 132 takes up the locking position shown at 132A to prevent the compression spring 118 from releasing the dead bolt. In case of fire, the rise in temperature will cause the unbending of 132A to the 132 position and the spring 118 will operate. Spring materials or arrangements for 118 must be selected to be operable at high temperatures.

Referring now to FIG. 3, a further embodiment of the invention is shown wherein staples 18 on mounting plates 22 are secured to each of door 10 and structure 12. The shape memory wire 30 with, weight 34 secured thereto by crimps 36, is bent from a straight wire to one passing through the staples. Under the heat of a fire, wire 30 will straighten and fall out of staples 18 allowing the door to be opened.

FIG. 4 shows a further embodiment wherein two shape memory rods 230 are mounted on plates 220 which are secured to a wall of the stall or stable 12 and door 10 by screws 221. The rods 230 have a normal high temperature straight positions (to remember in a fire) as indicated in phantom at 230A and are bent to the shape shown in solid to provide hooks or loops through which a twig or stick or bar, etc., may be inserted to prevent opening of door 10.

FIG. 4A shows the parts 220, 221, 230 in cross section with screws 221 removed. Wire 230 has a headed end 231 as produced by a heading tool and passes through a hole 229 in plate 220. Holes 219 are also provided for screws 221. Instead of heading, wire 230 can be made at a diameter as indicated by 233; compressed to pass through hole 229 and allowed to expand to make use of another aspect of shape memory material properties.

FIG. 5 shows another embodiment of the invention wherein rod 530 of shape memory material passes through a plate 520 mounted inside an enclosure by screws 521 passing into the inner face of the door 10. This more direct exposure to the ambient temperature of the building enclosure assures more reliable and speedies response of the rod to fire conditions.

As a further alternative plates 220 or 520 and mounting screws could be eliminated and an end of rod 230 or 530 could be pointed or screw threaded to constitute the mounting means therefor.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Locking system comprising
means defining locking means including two engaging parts,
means for normally preventing said parts from separating and comprising a limiting member of martensitic transformation shape memory alloy material plastically deformed to a configuration which prevents disengagement and constructed and arranged to automatically undo said deformed configuration and restore the shape of the member to an orginial configuration which allows said disengagement and wherein said preventing means comprise an elongated length of shape memory rod having a bondable free end and a supported end.

2. Locking system comprising
means defining locking means including two engaging parts,
means for normally preventing said parts from separating and comprising a limiting member of martensitic transformation shape memory alloy material plastically deformed to a configuration which prevents disengagement and constructed and arranged to automatically undo said deformed configuration and restore the shape of the member to an original configuration which allows said disengagement and wherein said locking means comprise an elongated length of said martensitic transformation shape memory alloy material with a fall-weight attached to one end thereof, the other end being free, so that the weight can cause the locking means to fall unless the free end cannot clear the locking means in a particular configuration thereof.

3. Locking system in accordance with claim 2 wherein said limiting member is integral with the locking means.

4. Locking system in accordance with claim 2 wherein said locking means comprise hasp-lock elements.

5. Locking system in accordance with claim 1 wherein said locking means comprises a dead bolt type lock element.

6. Locking system comprising,
means defining locking means including two engaging parts,
means for normally preventing said parts from separating and comprising a limiting member of martensitic transformation shape memory alloy material plastically deformed to a configuration which prevents disengagement and constructed and arranged to automatically undo said deformed configuration and restore the shape of the member to an original configuration which allows said disengagement and for an enclosure defined by building structure wherein said locking means are integral with said limiting member and comprise at lease one rod of martensitic transformation shape memory alloy material and means for mounting an end thereof to a building structure, the other end being free for deformation to hold a locking bar or the like.

7. Locking system in accordance with claim 6 wherein two said rods are utilized, one being mounted to a door and the other to fixed building structure.

8. Locking system in accordance with claim 6 wherein said rod is exposed essentially directly to ambient temperature within the enclosure.

* * * * *